Figures 1, 2, 3, 4, 5:
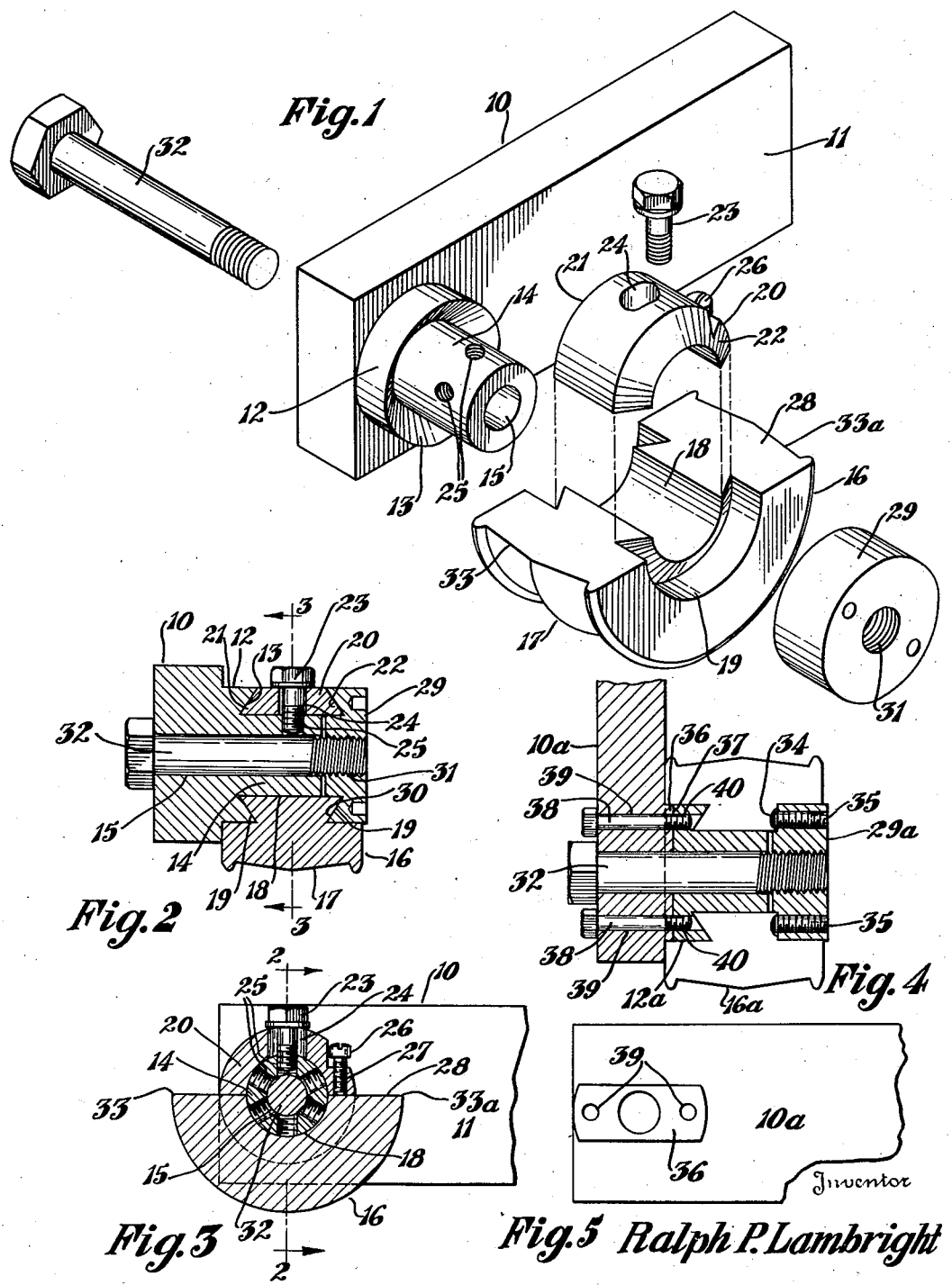

Nov. 28, 1939.  R. P. LAMBRIGHT  2,181,137

FORMING AND FINISHING TOOL

Filed Feb. 7, 1938

Inventor
Ralph P. Lambright
By Frease and Bishop
Attorneys

Patented Nov. 28, 1939

2,181,137

UNITED STATES PATENT OFFICE 2,181,137

FORMING AND FINISHING TOOL

Ralph P. Lambright, Canton, Ohio

Application February 7, 1938, Serial No. 189,105

13 Claims. (Cl. 29—102)

The invention relates to forming and finishing tools and holders for the same, and more especially to such tools particularly adapted to use on multiple spindle automatic screw machines for machining metal.

Tools of this character are formed of a very expensive steel and the common type of tool now used on automatic machines of the character referred to are of substantially circular shape having a notch formed on one side to produce the cutting edge and provide a certain amount of chip clearance. The tool is ground away as the cutting edge becomes worn and rotates upon its axis to properly position the newly formed cutting edge. Such tools are usually attached to a holder or bar by means of an axial bolt around which the tool may be rotated for adjustment, radial rack or ratchet teeth being formed upon the opposed faces of the tool and holder for holding the tool in adjusted position when the bolt is tightened.

In tools and holders of the character referred to, now in general use, due to their shape, a considerable portion of the material of the tool itself, which is of high grade steel, is wasted in providing a certain amount of chip clearance. Even with this waste of expensive material the tools now in common use do not provide sufficient chip clearance for efficient operation. This clearance is a vital necessity in order to keep the chips arising from the material from piling up in front of the tool, preventing the cutting oil from reaching the cutting edge of the tool. Failure to keep this oil from reaching the cutting edge of the tool causes burning of the tool, necessitating more frequent grinding, and in some cases the heating of the tool may cause the breaking or damaging of the tool or holder or machine parts. The forming of the ratchet or rack teeth upon the tool and holder requires milling machine operations which add to the production cost of such tools and holders.

It is an object of the present invention to provide a tool and holder especially adapted for use on multiple spindle automatic screw machines and the like, which overcomes the above mentioned and other objections to tools of this character now in general use.

One object of the invention is to provide a tool and holder so constructed that a much greater chip clearance is provided.

Another object is to so shape the tool that there is a minimum of waste of the high priced steel of which the tool itself is formed.

A further object is to provide such a tool at a minimum of cost of production by eliminating the milling machine operations above referred to, the improved tool being formed upon a lathe from a round bar of cutting steel machined to size and shape upon a lathe and then sawed through its diameter to provide two identical tools from the same amount of material and with less machine work than required for producing one of the tools in present practice.

A still further object of the invention is to provide simple and convenient means for quickly and easily adjusting the position of the tool without removing it from the holder, or interferring with its alignment.

Another object is to provide convenient means for removing the tool from the holder without removing the holder from the slide of the machine.

The above objects together with others which will be apparent from the accompanying drawing and the following description, or which may be later referred to, may be attained by constructing the improved tool and holder in the manner illustrated in the accompanying drawing in which:

Fig. 1 is an expanded perspective view of the several parts of the improved tool and holder.

Fig. 2, a vertical transverse sectional view through the assembled tool and holder taken as on the line 2—2 Fig. 3.

Fig. 3, a section taken as on the line 3—3 Fig. 2.

Fig. 4, a horizontal sectional view through a slightly modified form of tool and holder, and:

Fig. 5, a detached fragmentary elevation of a portion of the holder shown in Fig. 4.

Similar numerals refer to similar parts throughout the drawing.

The holder for the improved tool is indicated generally at 10 and comprises the shank portion 11 adapted to be fastened in any convenient manner into the usual slide upon an automatic machine, a head being formed upon the opposite end portion of the holder for attaching the improved tool as will be later explained in detail.

This head is formed upon one side of the holder as best shown in Fig. 1 and comprises a boss 12 having its outer side undercut so as to produce the outwardly flared beveled surface 13, a concentric spindle portion 14 being formed integral with the head. An axial bore 15 in said spindle portion extends entirely through the opposite side of the holder 10, as best shown in Fig. 2.

The tool indicated generally at 16, is substantially semi-circular in shape and provided with a peripheral contour as indicated at 17 to produce the desired shape of cutting edge. An axial semi-cylindric groove 18 is formed in the tool of suitable dimensions to snugly fit around one-half of the spindle 14 provided upon the head of the holder. A half round bevel groove 19 is formed in each side of the tool surrounding each end of the axial groove 18 and arranged to fit the inclined face 13 of the head, as best shown in Fig. 2.

This tool may be conveniently formed from a round bar of suitable steel which may be formed entirely upon a lathe and then sawed diametrically in half, forming two identical tools of the character illustrated. A substantially half round filler 20 of considerably less diameter than the tool, is adapted to be located around the other side of the spindle 14. This filler is provided with the oppositely beveled ends 21 and 22, conforming to the beveled surface 13 of the head, with which the end 21 of the filler is adapted to be engaged.

For the purpose of adjusting the tool 16, radially around the spindle to properly position the cutting edge as the tool is ground, an adjusting screw 23 is adapted to be located through the elongated slot 24 in the filler and to selectively engage one on the radially disposed tapped apertures 25 in the spindle 14. This provides for each major adjustment of the tool, and a slight further adjustment may be produced by means of a small screw 26 threaded through a tapped bore 27 in the filler and engaging the flat upper surface 28 of the tool.

It should be understood that instead of providing a separable screw through a bore in the holder and head, an integral threaded extension may be provided upon the spindle, corresponding to the threaded portion of the screw 23, or if desired the entire spindle may be in the form of a removable bolt. It should also be understood that these threads should be left hand threads where the tool is used for right hand cutting, and right hand threads where the tool is used for left hand cutting, in order to prevent loosening of the tool upon the holder by the cutting operation.

For clamping the tool upon the holder in adjusted position a round nut 29 may be provided having the annular beveled groove 30 on its inner side shaped to conform to the abutting portions of the tool and filler as best shown in Fig. 2, and provided with the circular tapped bore 31 to receive the threaded end of the cap screw 32 which is located through the axial bore 15 for clamping the tool and filler between the holder and nut.

As shown in Fig. 3, the cutting edge 33 of the tool is positioned to engage the material to be cut or formed. It will be seen that a considerable chip clearance is thus provided as the chips raising from the material cutting operation may pass backward and upward over the filler 20 which is of considerably less diameter than the tool 16.

The tool as illustrated and described is assembled for use for right hand cutting. If it is desired to use the tool for left hand cutting the holder 10 is turned over so that the head is located on the other side thereof and the position of the tool 16 is reversed so that the cutting edge 33a may be used, the tool being otherwise assembled as above described.

While the foregoing type of tool and holder is the preferred type there may be some occasions where it is not necessary to provide a tool that can be operated either right or left hand, and therefore, it is not the intention to limit the invention to a reversible tool.

In Fig. 4, is shown a modification of the invention in which a non-reversible-tool 16a is illustrated. For this purpose the tool, holder, and other parts may be the same as above described excepting that the tool and associated parts have the beveled or dovetail interengaging arrangement only on the side toward the holder, the opposite side of the tool and filler having an annular recess 34 adapted to receive the adjacent end portion of the nut 29a which may be provided with a plurality of small screws 35 adapted to be forced against the bottom of the annular recess 34 so as to supplement the clamping action of the cap screw 32.

As a further modification of the invention, for either a reversible or non-reversible tool, as shown in Figs. 4 and 5, the holder 10a may be formed separate from the head 12a and may be provided on one side with a rib 36 adapted to be received in a correspondingly shaped groove 37 on the opposite face of the head 12a. Small screws 38 may be located through the apertures 39 in the holder and threaded into tapped openings 40 in the head for preventing any turning of the head relative to the holder.

It is to be noted that this new type tool may be held in rigid position without the necessity of having the usual rack arrangement to prevent slipping used now on the common type of tool, thus materially reducing the expense of the manufacture of the tool. The new type tool, it will be noted, can be completely formed from round bar stock by means of the usual lathe procedure, while the older type tool with a rack required milling machine operations.

It is thus to be noted that this new type tool can be made with less machine operation and less material for a given cutting life; that it provides a tool for either right or left hand operation; that with the assembly shown fine adjustment of the tool can be made without removing the tool from the holder; that by means of the dovetail arrangement the tool is automatically aligned excepting bringing it up to center position for cutting, and the dovetail arrangement also provides rugged means for holding the tool in fixed position; and the tool may be readily removed from the holder without loosening the holder in the slide of the machine, facilitating the rapid removal and assembly of the tool and placing it in cutting position.

I claim:

1. The combination of a holder having a spindle extending laterally from one side thereof, there being an axial bore through said spindle extending through the opposite side of the holder, a half round tool with a cutting edge extending transversely across the periphery thereof and located around one side of the spindle, a substantially half round filler of less diameter than the tool located around the other side of the spindle and abutting the tool, means for holding the filler in adjusted position upon the spindle, a screw located through said bore, a nut mounted upon said screw, and interengaging formations upon opposite sides of the tool and filler and the corresponding sides of the holder and nut.

2. The combination of a holder having a spindle extending laterally from one side thereof, there being an axial bore through said spindle extending through the opposite side of the holder, a half round tool with a cutting edge extending transversely across the periphery thereof and located around one side of the spindle, a substantially half round filler of less diameter than the tool located around the other side of the spindle and abutting the tool, an adjusting screw for holding the filler in adjusted position upon the spindle, a screw located through said bore, a nut mounted upon said screw, and interengaging formations upon opposite sides of the tool and filler and the corresponding sides of the holder and nut.

3. The combination of a holder having a spindle extending laterally from one side thereof, there being an axial bore through said spindle extending through the opposite side of the holder, a half round tool with a peripheral cutting edge located around one side of the spindle, a substantially half round filler of less diameter than the tool located around the other side of the spindle and abutting the tool, means for holding the filler in adjusted position upon the spindle, a screw located through said bore, a nut mounted upon said screw, and interengaging dovetail formations upon opposite sides of the tool and filler and the corresponding sides of the holder and nut.

4. The combination of a holder having a spindle extending laterally from one side thereof, there being an axial bore through said spindle extending through the opposite side of the holder, a half round tool with a peripheral cutting edge located around one side of the spindle, a substantially half round filler of less diameter than the tool located around the other side of the spindle and abutting the tool, there being a plurality of radial openings in the spindle and an elongated slot in the filler, an adjusting screw located through said slot for selectively engaging one of said radial openings, a screw located through said bore, a nut mounted upon said screw, and interengaging formations upon opposite sides of the tool and filler and the corresponding sides of the holder and nut.

5. The combination of a holder having a spindle extending laterally from one side thereof, there being an axial bore through said spindle extending through the opposite side of the holder, a half round tool with a peripheral cutting edge located around one side of the spindle, a substantially half round filler of less diameter than the tool located around the other side of the spindle and abutting the tool, there being a plurality of radial openings in the spindle and an elongated slot in the filler, an adjusting screw located through said slot for selectively engaging one of said radial openings, a second adjusting screw located through one end of the filler and against the corresponding end of the tool, a screw located through said bore, a nut mounted upon said screw, and interengaging formations upon opposite sides of the tool and filler and the corresponding sides of the holder and nut.

6. The combination of a holder having a spindle extending laterally from one side thereof, there being an axial bore through said spindle extending through the opposite side of the holder, a half round tool with a peripheral cutting edge located around one side of the spindle, a substantially half round filler of less diameter than the tool located around the other side of the spindle and abutting the tool, means for holding the filler in adjusted position upon the spindle, a screw located through said bore, a nut mounted upon said screw, and interengaging formations upon opposite sides of the tool and filler and the corresponding sides of the holder and nut, and a plurality of smaller screws located through said nut and contacting the adjacent sides of the tool and filler.

7. The combination of a holder having a spindle extending laterally from one side thereof, there being an axial bore through said spindle extending through the opposite side of the holder, a half round tool with a peripheral cutting edge located around one side of the spindle, a substantially half round filler of less diameter than the tool located around the other side of the spindle and abutting the tool, means for holding the filler in adjusted position upon the spindle, a screw located through said bore, a nut mounted upon said screw, and similar interengaging formations upon opposite sides of the tool and filler and the corresponding sides of the holder and nut whereby the tool may be reversed upon the holder for either right hand or left hand use.

8. The combination of a holder having a spindle extending laterally from one side thereof, an axial threaded extension at the end of the spindle, a half round tool with a peripheral cutting edge located around one side of the spindle, a substantially half round filler of less diameter than the tool around the other side of the spindle and abutting the tool, means for holding the filler in adjusted position upon the spindle, a nut mounted upon said threaded extension, and interengaging formations upon opposite sides of the tool and filler and the corresponding sides of the holder and nut.

9. The combination of a holder having a spindle extending laterally from one side thereof, there being an axial bore through said spindle extending through the opposite side of the holder, a half round tool with a cutting edge extending transversely across the periphery thereof and located around one side of the spindle, a substantially half round filler of less diameter than the tool located around the other side of the spindle and abutting the tool, means for holding the filler in adjusted position upon the spindle, a screw located through said bore, a nut mounted upon said screw, and interengaging formations upon opposite sides of the tool and filler and the corresponding sides of the holder and nut, said formations being so shaped that the tool is automatically aligned upon the spindle when the nut is tightened.

10. The combination of a holder having a spindle extending laterally from one side thereof, a tool with a circular outer surface and a cutting edge extending transversely across the periphery thereof and located upon said spindle said cutting edge being substantially parallel with the axis of the spindle, interengaging tapered annular formations upon opposed faces of the tool and holder, and means for clamping the tool against the holder.

11. The combination of a holder having a spindle extending laterally from one side thereof, a segmental tool with a cutting edge extending transversely across the periphery thereof and located around one side of the spindle said cutting edge being substantially parallel with the axis of the spindle, a segmental filler located around the other side of the spindle and substantially abutting the tool, interengaging, tapered, annular formations upon opposed faces of the holder and the tool and filler, and means for clamping the tool and filler against the holder.

12. The combination of a holder having a spindle extending laterally from one side thereof, a segmental tool with a cutting edge extending transversely across the periphery thereof and located around one side of the spindle said cutting edge being substantially parallel with the axis of the spindle, a segmental filler located around the other side of the spindle and substantially abutting the tool, means for holding the filler in adjusted position upon the spindle, interengaging, tapered, annular formations upon opposed faces of the holder and the tool and filler, and means for clamping the tool and filler against the holder.

13. The combination of a holder having a spindle extending laterally from one side thereof, a segmental tool with a cutting edge extending transversely across the periphery thereof and located around one side of the spindle, a segmental filler located around the other side of the spindle and substantially abutting the tool, means for holding the filler in adjusted position upon the spindle, and means for adjusting the tool relative to the filler, interengaging, tapered, annular formations upon opposed faces of the holder and the tool and filler, and means for clamping the tool and filler against the holder.

RALPH P. LAMBRIGHT.